United States Patent [19]

Okamura

[11] Patent Number: 5,045,677
[45] Date of Patent: Sep. 3, 1991

[54] COMBINING BAR CODE READ DATA FROM A PLURALITY OF SCANNING LINES FORMED FROM ONE-DIMENSIONAL IMAGES

[75] Inventor: Hideki Okamura, Osaka, Japan

[73] Assignee: Sumitomo Electric Industries, Ltd., Osaka, Japan

[21] Appl. No.: 250,181

[22] Filed: Sep. 28, 1988

[30] Foreign Application Priority Data

Sep. 28, 1987 [JP] Japan ............................ 62-245293
Sep. 28, 1987 [JP] Japan ............................ 62-245294

[51] Int. Cl.$^5$ .......................... G06K 7/01; G06K 5/00
[52] U.S. Cl. ..................................... 235/462; 235/470
[58] Field of Search ............... 235/454, 456, 461, 462, 235/463, 467, 470

[56] References Cited

U.S. PATENT DOCUMENTS

| | | | |
|---|---|---|---|
| 4,289,957 | 9/1981 | Neyroud et al. | 235/462 |
| 4,409,469 | 10/1983 | Yasuda et al. | 235/462 |
| 4,488,678 | 12/1984 | Hara et al. | 235/463 |
| 4,652,730 | 3/1987 | Marshall | 235/456 |
| 4,745,484 | 5/1988 | Drexler et al. | 358/213.13 |

FOREIGN PATENT DOCUMENTS

| | | |
|---|---|---|
| 0043124 | 6/1982 | European Pat. Off. . |
| 0250778 | 1/1988 | European Pat. Off. . |
| 3101827 | 11/1981 | Fed. Rep. of Germany . |
| 2423829 | 11/1979 | France . |
| 57-164373 | 10/1982 | Japan . |

Primary Examiner—Stuart S. Levy
Assistant Examiner—Robert Weinhardt
Attorney, Agent, or Firm—Cushman, Darby & Cushman

[57] ABSTRACT

A bar code reading arrangement (apparatus and method) for reading and combining and connecting fragmentary read data. A bar code scanner provides a plurality of one-dimensional images and comprises an image sensor for reading the bar code data. As the scanner is moved relative to the bar code, a plurality of parallel scanning lines are formed from the one-dimensional images. Bar code data segments from the scanning lines are read by the image sensor and are combined in accordance with a pre-processing and combining method. The pre-processing method comprises the steps of: reading information on the image sensor concerning the positions of end points located at or near both ends of the bar code; defining an end point as being fixed or moving, based on the relative positional change of the end point; and reading the data segments as both bar code information, and positional information with respect to the positions of the end points.

3 Claims, 7 Drawing Sheets

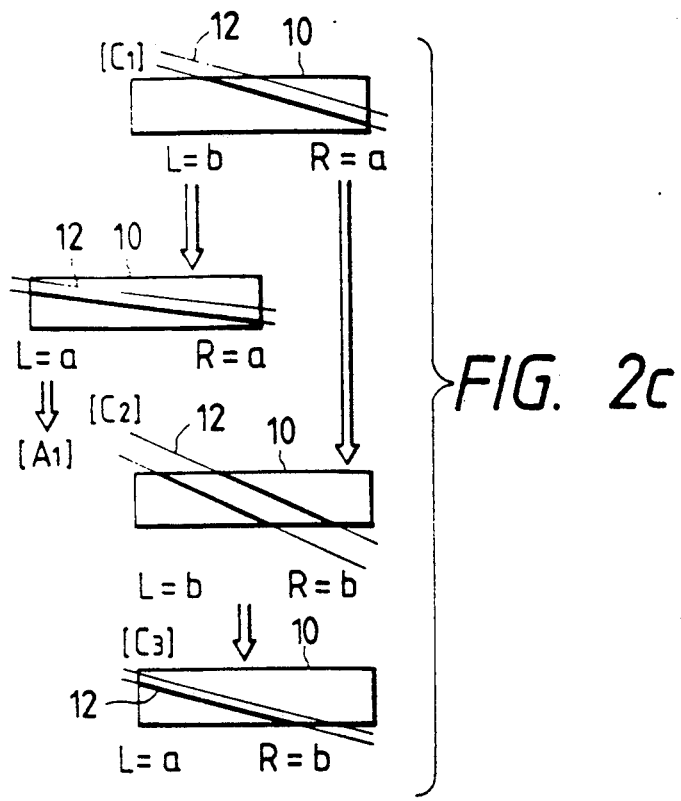
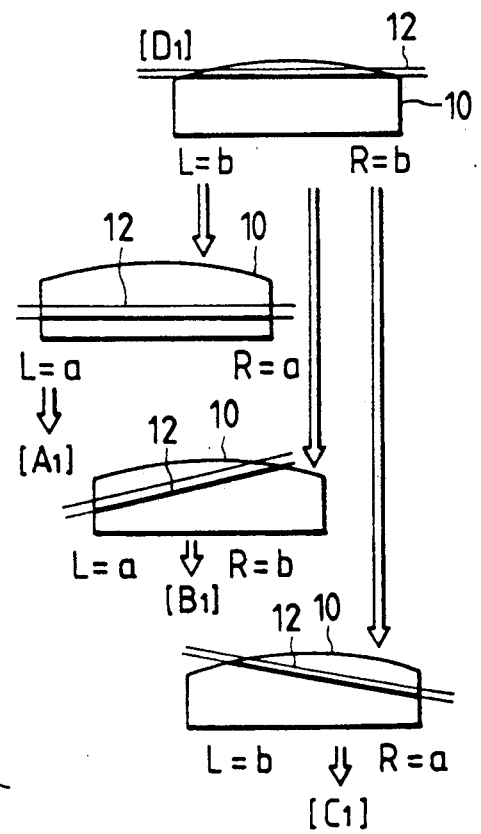

COMBINING BAR CODE READ DATA FROM A PLURALITY OF SCANNING LINES FORMED FROM ONE-DIMENSIONAL IMAGES

BACKGROUND OF THE INVENTION

1. Field of the Invention

The present invention relates in general to bar code reading, including a reading system and a reading method. More specifically, the invention is directed to a pre-processing apparatus and method for use in combining fragmentary bar code read data.

2. Description of the Prior Art

Pen-type readers and stationary readers employing laser light are known as a means for optically reading bar codes. Further, so-called one touch type readers that employ a one-dimensional image sensor (hereinafter referred to as a "line sensor") for improving the operability of scanning cylindrical commodities such as bags having irregular shapes and cans have recently been becoming the mainstream of bar code scanning systems.

When a bar code is scanned with a reader of the type described above, if the angle of inclination of scanning with respect to the bar code is larger than a predetermined angle, a part of the bar code falls out of the field of view of the line sensor, so that only a fragment of the bar code can be read. In such a case, in order to read the entire bar code, the operator must repeat the scanning operation.

In order to minimize the difficulty experienced by the operator when repeatedly conducting the bar code read operation, it is conventional practice to set the height of bar codes so as to be greater than a predetermined level. In the case of stationary readers, a bar code may need to be scanned in a multiplicity of directions (e.g., four directions).

Since bar codes are printed on media such as price tags, labels, etc the size of the media is predetermined and the bar code must be sized to fit the media. A special-purpose printer is needed to print the codes on the media. In the case of stationary readers, it is necessary to scan a bar code in multiplicity of directions at the same time, which complicates both the hardware and software arrangements.

SUMMARY OF THE INVENTION

The above-described problems may be solved by combining fragmentary read data by connecting the fragments together. The present invention provides a bar code reading arrangement (apparatus and method) wherein a bar code reader is provided with a one-dimensional image sensor for reading bar code data. The image sensor and bar code are moved relative to each other to scan and optically read the bar code.

To effect combining, certain pre-processing steps are carried out, such as deciding whether or not combining is needed, setting a range within which the bar code information is to be collected, and monitoring the movement thereof. Thus, the present invention further provides a pre-processing method for combining bar code read data comprising the steps of: reading information on the one-dimensional image sensor concerning the positions of end points located at, or near, both ends of the bar code; defining an end point having a relatively small positional change to be a fixed end point, and an end point having a relatively large positional change to be a moving end point; and reading data as both bar code information, and position information with respect to the positions of the end points during a time interval that begins when one of the end points is a fixed end point and the other is a moving end point and ends when the moving end point becomes a fixed end point.

BRIEF DESCRIPTION OF THE DRAWINGS

FIG. 2c shows another case where one end point of the scanning line is a fixed end point, and the other end point is a moving end point.

FIG. 2d illustrates a case where the medium of the bar code is deformed.

DETAILED DESCRIPTION OF THE PREFERRED EMBODIMENT

Figure 1:
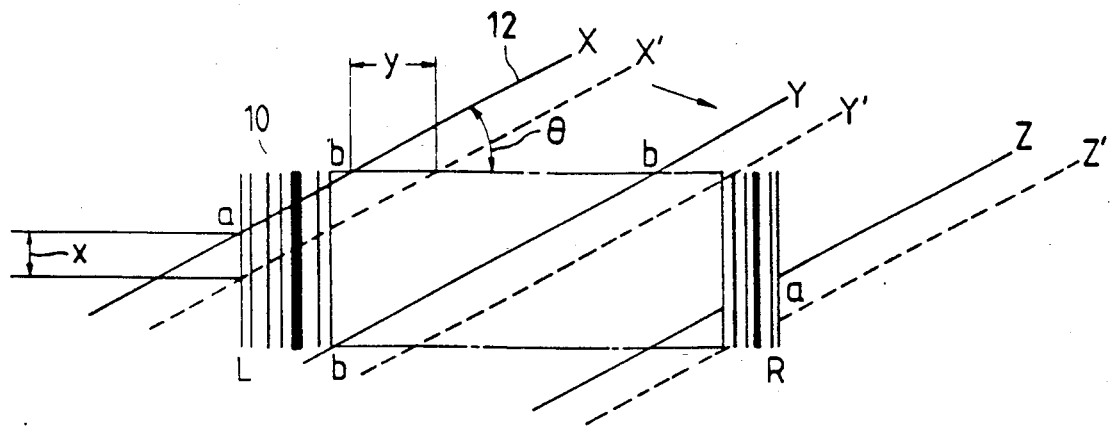
FIG. 1 is an illustration of the relationship between the scanning lines and the bar code.

FIG. 1 is an illustration of the relationship between the scanning lines and the bar code. The left-hand end of bar code 10 is denoted by L, while the right-hand end thereof is denoted by R. The inclination angle $\Theta$ of scanning line 12 of a line sensor includes a negative inclination angle (in the case where scanning line 12 is inclined to move from the left-bottom corner to the right-top center as illustrated) and a positive inclination angle (in the case where scanning line 12 is inclined to move from the left-top corner to the right-bottom corner). When the inclination angle $\Theta$ is so small that scanning line 12 extends over from the left-hand end L to the right-hand end R of bar code 10 (i.e., when both ends of bar code 10 are within the field of view of line sensor 12), it is unnecessary to effect combining of read data.

The inclination angle $\Theta$ of scanning line 12, the speed of movement of scanning line 12 and the scanning period are substantially constant. There are cases where either bar code 10 or line sensor 12 move relative to each other. The present invention may be applied to either case.

When the inclination angle $\Theta$ of scanning line 12 is positive, scanning line 12 moves parallel from the left-top corner to the right-bottom corner of bar code 10. When the inclination angle $\Theta$ is negative, scanning line 12 moves parallel from the right-top corner to the left-bottom corner of bar code 10 as shown by the representative example lines X, Y and Z. The intersections of scanning line 12 and the left and right-hand ends L, R of bar code 10 are denoted by the reference symbol a, while the intersections of scanning line 12 and the upper and lower sides of bar code 10 are denoted by the reference symbol b. The points a and b show end points of bar code information sensed by line sensor 12.

In the case where the position of scanning line 12 moves a predetermined distance from X to X', from Y to Y', or from Z to Z', the movement of points a and b can be expressed by x and y, respectively; if the inclination angle $\Theta$ is 45° or less, then x is less than y and the state of both ends of the bar code on the line sensor can be determined by making a judgment with respect to the amount of movement of the read data. In the present invention, a point where scanning line 12 intersects the left-hand end L or the right-hand end R of bar code 10, such as the point a, is defined as a fixed end point. A point where the scanning line 12 intersects the upper or lower side of the bar code 10 such as the point b, is defined as a moving point.

Figure 2A:
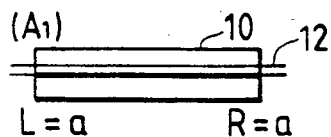
FIG. 2a shows a case where both end points of a scanning line initially are fixed end points.

FIG. 2a shows a case where both ends points are initially fixed end points a (L=a, R=a). Such a condition is herein denoted by the symbol $A_1$, whereby both ends of bar code 10 are initially within the field of view of the line sensor. Therefore, it suffices to perform reading as usual and decode the read data (shown by the bold line in FIG. 2a).

Figure 2B:
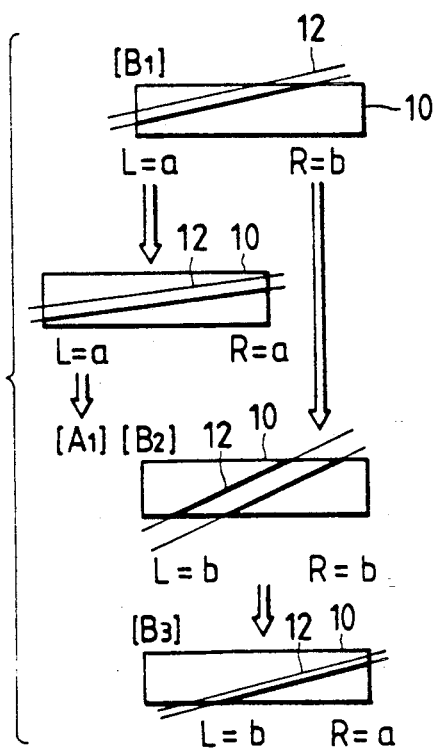
FIG. 2b shows a case where one end point of the scanning line is a fixed end point, and the other end point is a moving end point.

FIG. 2b shows a case where the inclination angle $\Theta$ is negative. In this case, in the initial condition $B_1$, read data is taken in at least once in order to obtain bar code information concerning the position of an end point at or near the left-hand end of bar code 10. If the inclination angle $\Theta$ of scanning line 12 is relatively small, the condition changes directly to a condition where L=a and R=a (i.e., the above described condition $A_1$). After the condition $A_1$ is established, the read data in condition $B_1$ is renewed to the read data in the condition $A_1$, and the process proceeds to a subsequent decoding processing.

On the other hand, if the inclination angle $\Theta$ in condition $B_1$ becomes relatively large, the condition changes from the condition $B_1$ to condition $B_2$ (L=b, R=b). In the condition $B_2$, bar code information at both end points change on each occasion; therefore, reading is executed for each scanning period to obtain data. When the condition changes to condition $B_3$ (L=b, R=a), read data is taken in at least once in order to obtain bar code information concerning the position of an end point at or near the right-hand end of bar code 10. Pieces of read data obtained in the conditions $B_1$ to $B_3$ are fragmentary but overlap each other and therefore include all the information concerning bar code 10 from the left-hand end L to the right-hand end R.

FIG. 2c shows a case where the inclination angle $\Theta$ is positive. In this case, the condition changes from $C_1$ to $A_1$, or from $C_1$ to $C_2$ then to $C_3$ in the same way as in of FIG. 2b except that the inclination angle $\Theta$ of scanning line 12 in this case is positive.

FIG. 2d shows a case where the medium concerned is defective, for example, the medium is partially deformed as illustrated. In this case, before the above-described condition $A_1$, $B_1$ or $C_1$ is reached, a condition occurs whereby L=b and R=b appears as shown by the condition $D_1$, so that no reading is carried out until the condition has changed to condition $A_1$, $B_1$ or $C_1$, at which time the corresponding processing condition is executed.

Figure 3:
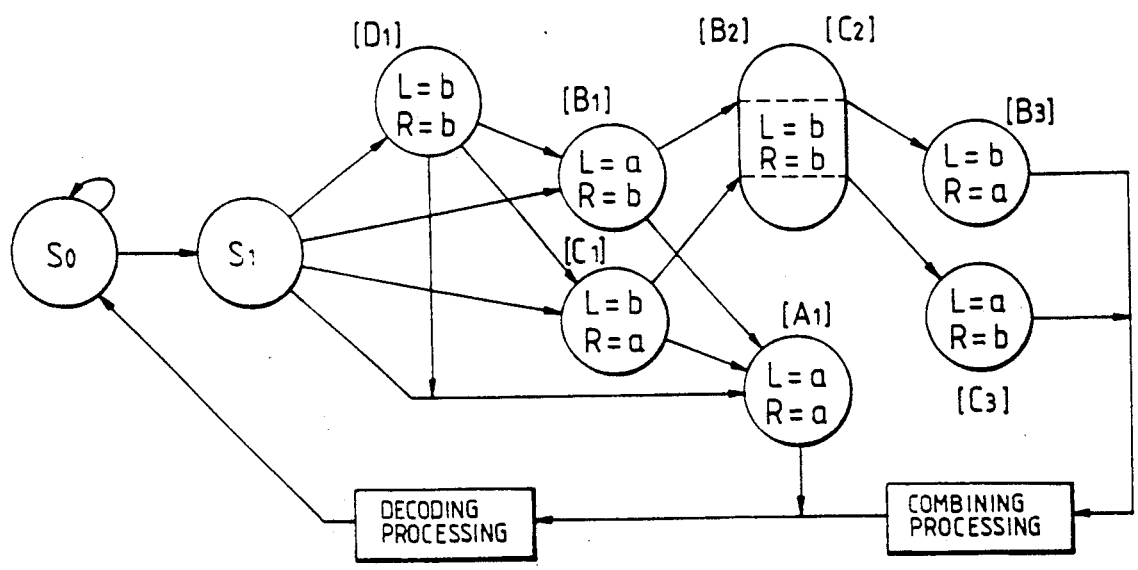
FIG. 3 shows a state diagram of the transition of the end points of the scanning line.

FIG. 3 shows the state transition of both end points at the left-hand end L and the right-hand end R. $S_0$ denotes an initial condition, while $S_1$ denotes the condition where bar code 10 appears. The state of the end points at L and R changes from the condition $S_1$ according to the above-described cases. When condition $A_1$ (L=a, b=a) is directly reached, the process is switched over to decoding processing. Further, when the condition $S_1$ changes directly to $A_1$, no combining processing is needed and therefore there is no need for pre-processing. However, if both fixed end points for L and R are reached through the conditions $B_2$, $C_2$ then $B_3$, $C_3$, the process is switched over to decoding processing after combining processing has been executed.

Figure 4:
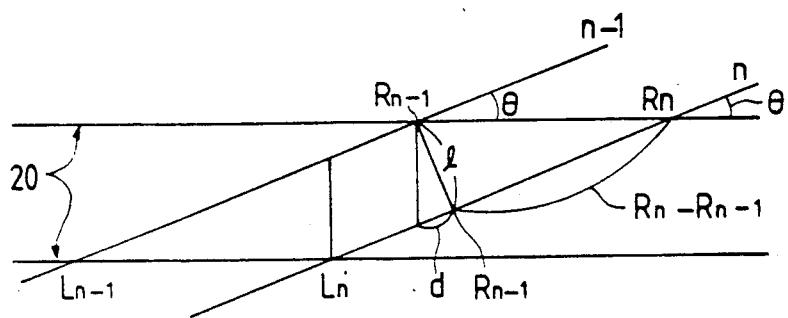
FIG. 4 shows the geometric relation between adjacent scanning lines.

FIG. 4 shows the geometric relation between two adjacent scanning lines, and illustrates one technique for combining read data from bar code 20. Addresses of read data on a line sensor are obtained by the n−1 th (n is an integer having a value of 2 or more) and n th scanning lines. The address of the starting (left-hand in this case) end point of the read data on the n th scanning line is $L_n$, while the address of the terminating (right-hand in this case) is $R_n$. In the case of the n−1 th scanning line the starting and terminating end point addresses are $L_{n-1}$ and $R_{n-1}$, respectively. The data of $Rn_{n-1}$ on the n−1 th scanning line is the terminating end of data which is to be combined and therefore referred to as the "data tail".

The space 1 between scanning lines n and n−1 is equal to a distance through which the scanning lines move during one scanning period. Assuming that the speed of movement of the scanning line, scanning period and the inclination angle $\Theta$ are constant as described above, the address of $R_{n-1}$ on the n−1 th scanning line is coincident with and corresponds to the address of that position on the n th scanning line where the perpendicular from $R_{n-1}$ intersects the n th scanning line at right angles.

During one scanning period, the position of the scanning line n−1 shifts by an amount corresponding to the distance d (shown in FIG. 4) on the n th scanning line while the scanning line advances through the distance 1. Accordingly the top end of the n th data on line n which is to be combined with the data on line n−1 is at the position $R_{n-1}-d$. The data at this position is referred to as "data head". The above-described distance d is geometrically obtained as follows:

$$d = \frac{l^2}{R_n - R_{n-1}}$$

Figure 5:
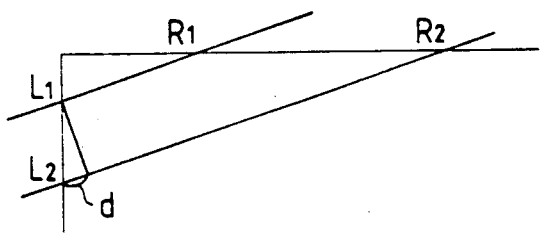
FIG. 5 shows the geometric relation between two adjacent scanning lines in further detail.

However, when it is difficult to assume 1, it is possible to approximate d. FIG. 5 illustrates that so long as the inclination angle $\Theta$ is not considerably large, the distance d is approximately equal to the distance of movement ($L_2 - L_1$) of the end point at the left-hand end (or the right-hand end) of the scanning line during one period, i.e., $d \approx L_2 - L_1$.

Combination of data is effected by connecting together the data tail, defined as the termination of data on line n−1 at address $Rn_{n-1}$, and the data head, defined as the beginning of data on line n at the address equal to the expression $R_{n-1}-d$. The result is a continuous stream of data. In order to increase the degree of accuracy, however, the following method may be effectively employed.

Figure 6:
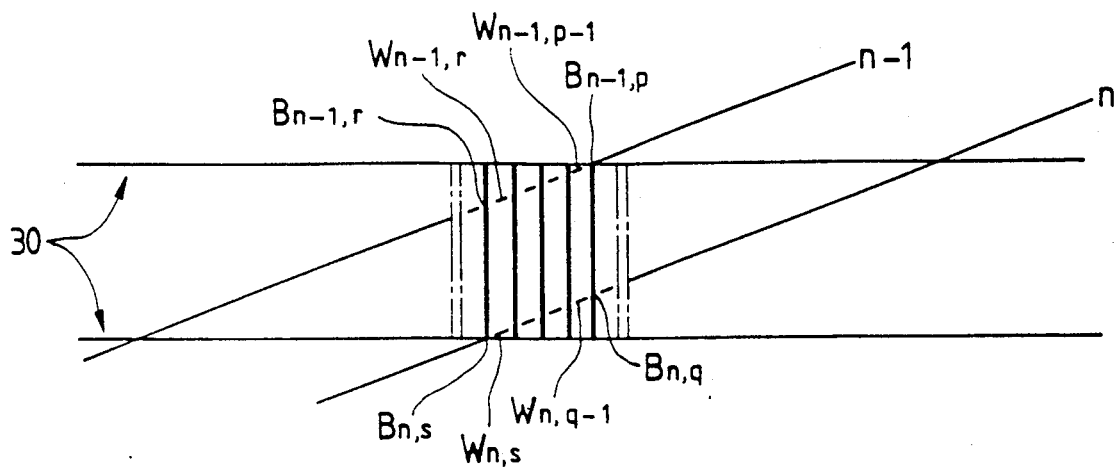
FIG. 6 shows the relation between adjacent scanning lines and a typical bar code.

FIG. 6 shows a model of a data tail, data head and their vicinities A bar code 30 provides a bar at the position of $R_{n-1}$ on the n−1 th scanning line which is denoted by $B_{n-1,p}$, while a space which immediately precedes the bar is denoted by $W_{n-1,p-1}$: the corresponding n th bar and space are denoted by $B_{n,q}$ and $W_{n,q-1}$, respectively. A bar which is at $L_n$ on the n th scanning line is denoted by $B_{n,s}$, while a space which is immediately subsequent to the bar is denoted by $W_{n,s}$, and the n−1 th bar and space which correspond to them are denoted by $B_{n-1,r}$ and $W_{n-1,r}$, respectively.

As shown in FIG. 6, the n−1 th scanning line barely touches the upper end of the bar $B_{n-1,p}$, while the n th scanning line barely touches the lower end of the bar $B_{n,s}$. If scanning is effected in this state bar data becomes shorter than the actual length; therefore, if such data is employed, the result of combining is incomplete.

For this reason, at the n−1th scanning line, a space $W_{n-1,p-1}$ which immediately precedes $B_{n-1,p}$ is preferably employed as a data tail, and at the n th scanning line, $W_{n,q-1}$ is correspondingly employed as a data head.

Although the combining accuracy is increased by connecting together the above-described data tail $W_{n-1,p-1}$ and data head $W_{n,q-1}$, it is also possible to further check data in the vicinities of the data tail and head with each other and judge the degree of coincidence between the data. Referring to FIG. 6, pieces of data which are present in the section on the n−1 th scanning line from $W_{n-1,p-1}$ to $W_{n-1,r}$ and pieces of data which are present in the corresponding section on the n th scanning line up to $W_{n,s}$ are compared, and if the degree of coincidence is high, the pieces of data concerning the corresponding positions are connected together. In this case, it may be considered that a data tail and a data head which are to be combined together are respectively provided with certain ranges.

If the degree of the above-described coincidence is low, the n th data is shifted either forward or backward by one bar or space and then a similar comparison is repeated.

Figure 7:
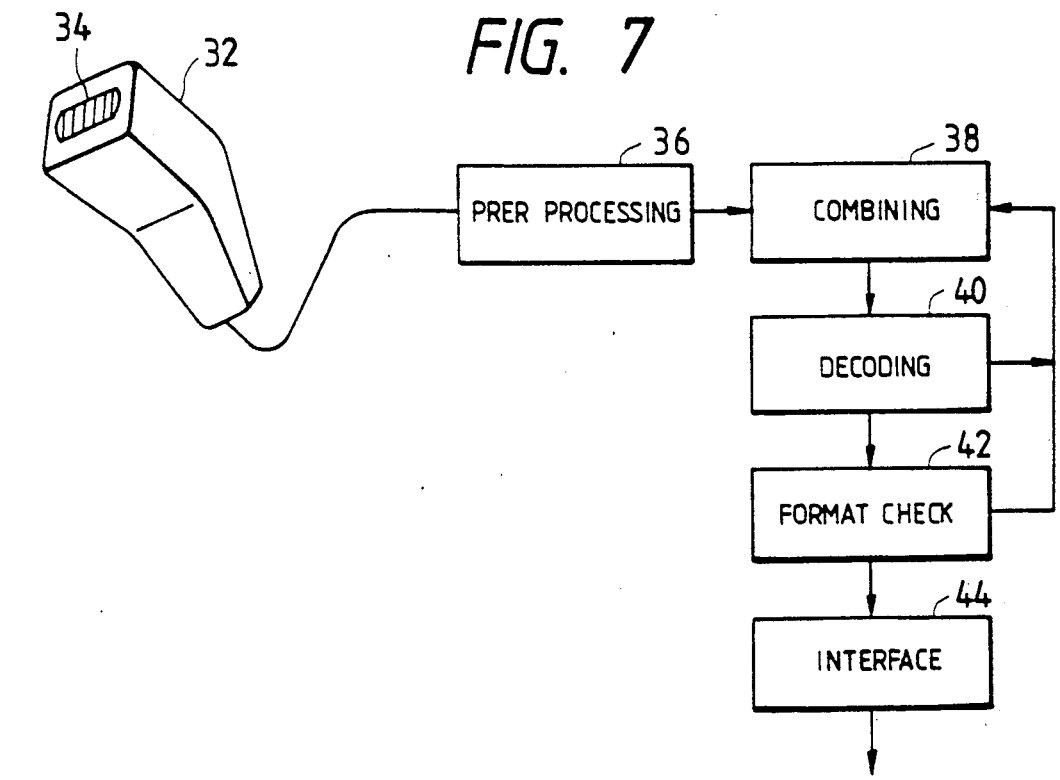
FIG. 7 shows an embodiment of the present invention.

FIG. 7 is a block diagram of a bar code reader provided with a bar code combining section according to the present invention. A one-touch type scanner 32 provides the above-described line sensor. Scanner 32 projects a plurality of one-dimensional images 34 which form scanning lines 12 as scanner 32 is moved across bar code 10. Fragmentary pieces of data which are optically read through scanner 32 are pre-processed in pre-processing section 36, then combined together in a combining section 38. The combined bar code information is recognized in a decoding section 40 and further checked in a format check section 42 as to whether or not the combined bar code information satisfies a predetermined condition. If it is judged that the predetermined condition is satisfied, the bar code information is output through an interface section 44.

If decoding section 40 and format check section 42 determine that no combining can be effected, or that the combined bar code information does not satisfy a predetermined condition because of considerable deformation of the medium, the process is executed over again from the combining processing.

Figure 8:
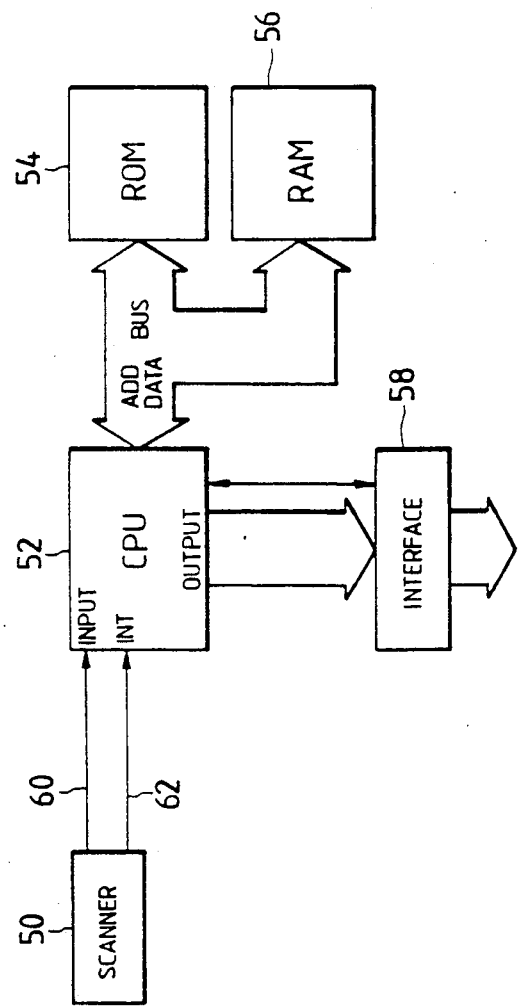
FIG. 8 is a block diagram of a controller for executing the functions in the present invention.

FIG. 8 is a block diagram of a microcomputer for executing the functions shown in the above-described block diagram. The reference numeral 50 denotes a one-touch type scanner, 52 a CPU, 54 a ROM, 56 a RAM, and 58 an interface.

Bar code information 60 and synchronizing signal 62 are input to CPU 52 from scanner 50. The contents of ROM 54 include pre-processing algorithm, combining algorithm, bar code decoder, format check, interface control, etc. The contents of the RAM 56 include a buffer for executing various programs, read data register, etc.

Figure 9:
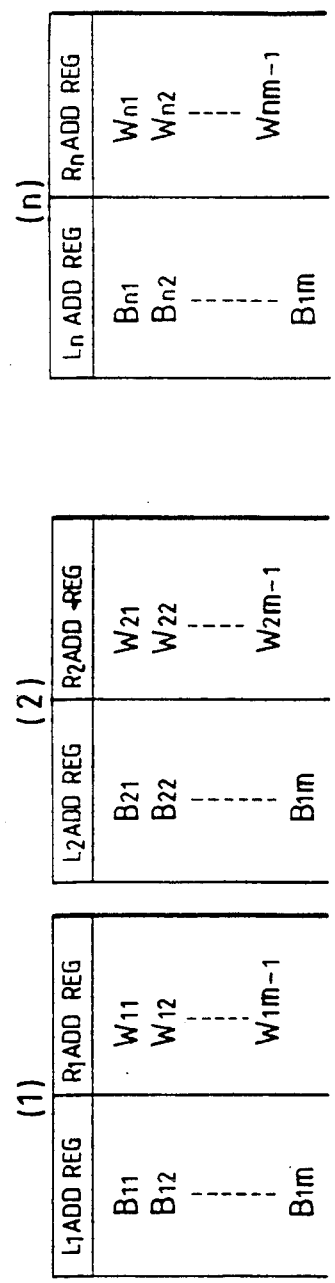
FIG. 9 shows a series of data registers from the controller in FIG. 8.

FIG. 9 shows a model of the data register incorporated in the RAM 56. Data obtained by each scanning from the first line to the n th line (n is a positive integer) is stored in the register. Generally, the address of a black bar at the left-hand end of the x th line is stored in "LxADD Reg", whereas the address of a black bar at the right-hand end of the x th line is stored in "RxAdd Reg." The length of the y th black bar on the x th line is stored in register Bxy, whereas the length of the y th white space on the x th line is stored in register Wxy.

Figure 10:
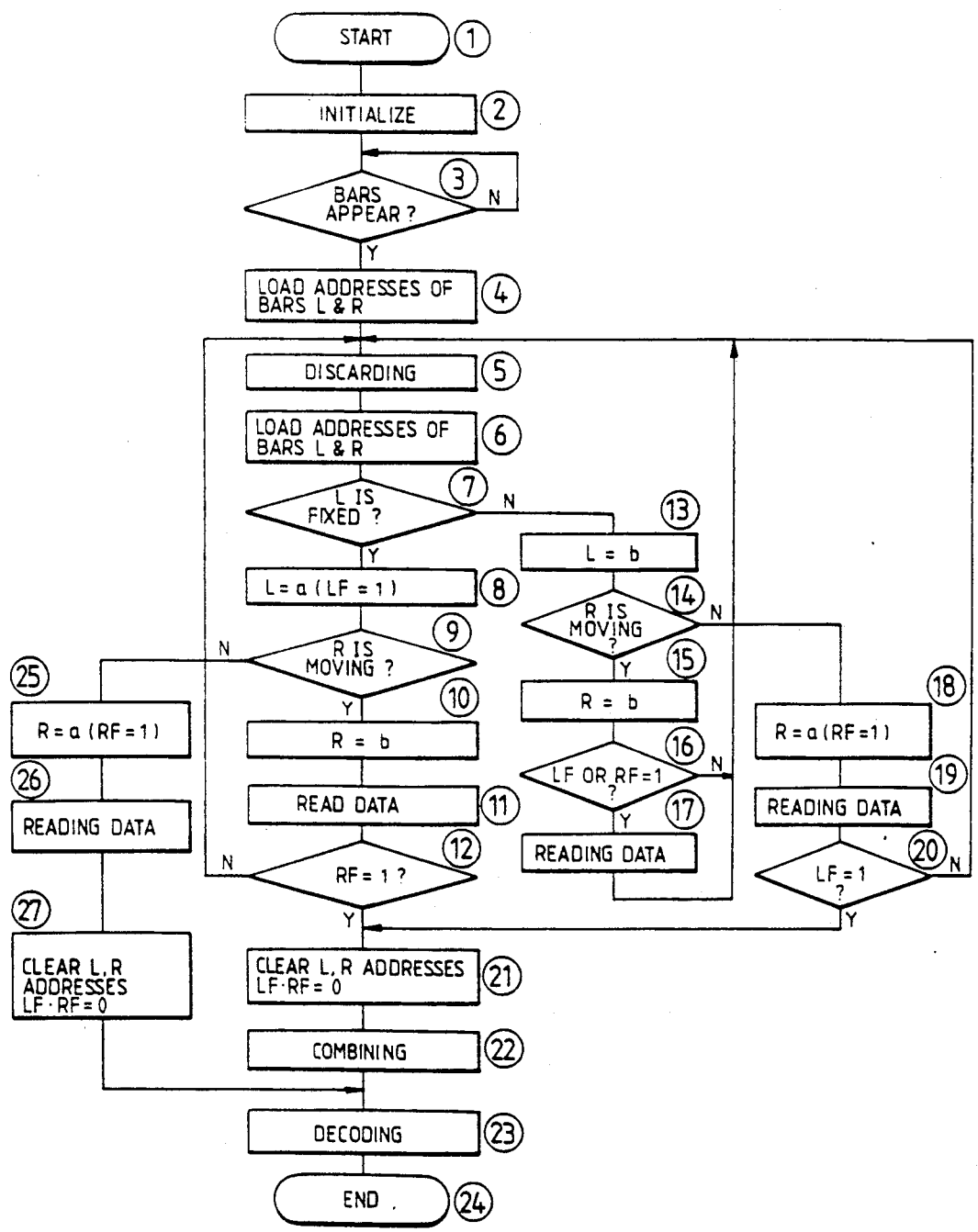
FIG. 10 shows a flowchart of the pre-processing algorithm.

FIG. 10 shows one example of a flowchart of the pre-processing for the bar code combining process. The flowchart will first be explained in order with respect to the case shown in FIG. 2b.

After the flow is started at Step 1, initialization is effected at Step 2. Then, if bars appear at Step 3, the addresses of bars L and R in Step 4 are stored at predetermined addresses for the first line in the above-described data register.

Next, it is judged whether or not L is fixed (Step 7). It is judged whether L and R are fixed end points a or moving end points b on the basis of the amount of change of the addresses of the bars L and R, (i.e. if $d \approx L_1 - L_2$ exceeds a predetermined value, L is a moving end point). However, since the judgment does not need a large amount of positional information, when the amount of movement is relatively small, unnecessary information is discarded by appropriately thinning out the positional information (Steps 5 and 6).

If it is judged that L is fixed (Step 7), the processing of L=a is executed and the flag LF=1 is set (Step 8). Next, it is judged whether or not R is moving (Step 9). If YES, the processing of R=b is executed (Step 10), and the data at this time is read (Step 11). Reading of data is repeated until the flag RF=1(Step 12) is set. Data in this case is renewed one after another.

If it is judged that L is not fixed in the course of executing the above-described repetitive routine, the processing of L=b (Step 13) is executed, and it is judged whether or not R is moving (Step 14). If YES, that is, if R is judged to be moving, the processing of R=b is executed (Step 15). If in this case LF=1 (Step 16), then data is repeatedly read until the flag RF=1 is set (Step 25). Data which is read in this case is stored one by one in predetermined lines in the data register.

If it is judged that R is not moving in the course of executing the above-described repetitive routine, the processing of R=a (Step 18) is executed. Then, the flag RF=1 is set, and data is further read (Step 19). Thereafter, it is judged whether or not LF=1 (Step 20). If YES, the addresses of L and R are cleared and the flags are restored to the initial state where LF=0 and RF=0 (Step 21). Then, the process proceeds to combining processing (Step 22). After completion of the combining processing decoding is effected (Step 23), thus completing the process (Step 24).

It should be noted that, if it is judged in Step 9 that R is not moving, the processing of R=a (RF=1) is executed (Step 25), and data at that time is read (Step 26).

Since, in this case, combining of data is not needed, the addresses of L and R are cleared, and the flags are restored to the initial state where LF=0 and RF=0. Then, the process proceeds to decoding.

Figure 11:
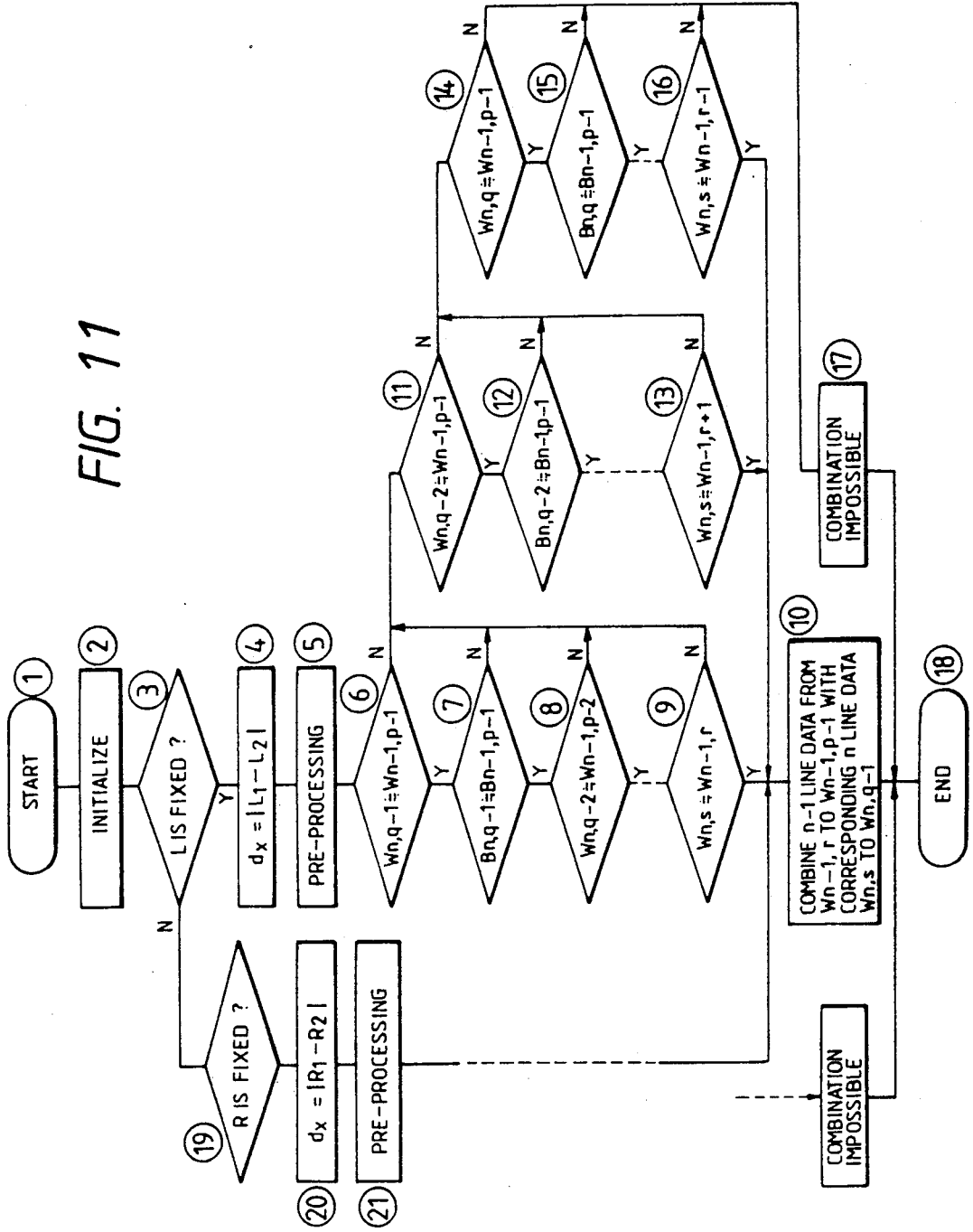
FIG. 11 shows a flowchart for the combining algorithm.

FIG. 11 shows a flowchart of the combining Step 22. After the flow is started (Step 1), initialization is effected (Step 2). Then, it is judged whether or not L is fixed (Step 3). If YES, the difference between L ($L_1$) of the first line and L ($L_2$) of the second line is calculated to obtain d (Step 4). Then, pre-processing is carried out according to the above-described procedure in FIG. 10. Thereafter, it is judged whether or not $W_{n,q-1}$ of the n th line and $W_{n-1,p-1}$ on the n−1th line are substantially equal to each other (Step 6). One reason why it is judged whether or not the two pieces of data are "substantially equal to each other" is that it is impossible to expect the two pieces of data to exactly coincide with each other due to the approximate calculation performed to obtain d. Instead, for areas on the two lines which are assumed to be overlapping each other, a similar judgment is made with respect to a bar and a space sequentially toward the starting end. When it is judged that all the corresponding pieces of data in the areas are approximate to each other, pieces of data on the n−1 th line from $W_{n-1,r}$ to $W_{n-1,p-1}$ and pieces of data on the n th line from $W_{n,s}$ to $W_{n,q-1}$ are laid one upon another for each coincident position to thereby combine data (Step 10).

When the degree of the above-described coincidence is low, a space $W_{n,q-2}$ on the n th line which immediately precedes the data to be checked and $W_{n-1,p-1}$ are judged as to the degree of coincidence therebetween. Thereafter the degree of coincidence is similarly judged up to $W_{n,s}$ and $W_{n-1,r-1}$ (Steps 11 to 13). When the degree of coincidence is still low, a space $W_{n,q}$ on the n th line which is immediately subsequent to the data to be checked and $W_{n-1,p-1}$ are judged as to the degree of coincidence; thereafter, the degree of coincidence is similarly judged up to $W_{n,s}$ and $W_{n-1,r-1}$ (Steps 14 to 16). When no coincidence is found even if these judgments are made, processing for incapability of combining is executed (Step 17), thus completing the flow.

As has been described above, the present invention provides the following effects Even when the angle of inclination of the sensor is larger than a predetermined angle so that read data is fragmentary a period from the time when either one of the end points of bar code information is a fixed end portion, and the other is a moving end point, to the time when the moving end point changes to a fixed end point can be judged. The time judgment is made on the basis of information concerning the positions of the end points of the bar code information which change sequentially, and information concerning the positions of the end points on the line sensor obtained during the judged period are read as data; a data tail and a data head of respective pieces of data are then connected together to thereby combine the pieces of data. Therefore, it is possible to reconstruct even fragmentary data. Accordingly, it is possible to reduce the height of bar codes as compared with those which have heretofore been employed.

While this invention has been described in connection with what is presently considered to be the most practical and preferred embodiment, it is to be understood that the invention is not limited to the disclosed embodiment, but, on the contrary is intended to cover various modifications and equivalent arrangements included within the spirit and scope of the appended claims.

What is claimed:

1. A method for reading and combining fragmentary bar code data from a bar code having a first and second edge, said method comprising the steps of:
   emitting a plurality of one-dimensional images from a scanner, each said image having an address corresponding to a point in time;
   moving once in a single direction said scanner relative to said bar code over a duration of a plurality of said points in time, thereby forming a plurality of scanning lines from a sequence of said one-dimensional images corresponding to said plurality of points in time, said scanning lines being parallel to each other, each of said scanning lines having along its length a sequence of said addresses corresponding to said sequence of one-dimensional images;
   reading a bar code data segment from each said scanning line, each said bar code data segment have a location corresponding to said address sequence, said reading step comprising the steps of:
   scanning said bar code data from a first of said scanning lines,
   determining whether a first occurrence of a fixed edge at said first edge of said bar code has occurred,
   determining whether a second occurrence of a fixed edge at said second edge of said bar code has occurred,
   reading a bar code data segment from a next adjacent scanning line only if said first edge and said second edge are both determined to be fixed edges, and
   repeating said step of determining whether said first occurrence has occurred with respect to said bar code data scanned from another of said scanning lines until said first edge and said second edge are both determined to be said respective fixed edges;
   determining for each of said bar code data segments a data head and a data tail; and
   combining said data tail from each said scanning line with a data head from said next adjacent scanning line, thereby combining the fragmentary bar code data, said combining step comprising the steps of:
   determining an address difference between said data trail of said scanning line and said data head from said next adjacent scanning line,
   comparing said bar code segment from said scanning line and an overlapping bar code data located, in accordance with said address difference, before said data head on said next adjacent scanning line,
   connecting said data head of said next adjacent scanning line to said data tail of said scanning line if said comparison falls within a predetermined range of similarity, and
   repeating said connecting step until said data tail is said second fixed edge.

2. A bar code scanning and data-combining system comprising:
   a scanner, capable of being moved relative to a bar code having a first and second edge, comprising:
   means for emitting a plurality of one-dimensional images, said plurality of one-dimensional images thereby forming a plurality of parallel scanning lines as said scanner is moved once across said bar code in a single direction, said emitting means including address generating means for sequentially generating an address for each of said plurality of one-dimensional images at a corresponding point in time, so that each of said plurality of scanning lines has a corresponding sequence of addresses, and means for reading a plurality of bar code data segments from adjacent parallel scanning lines, said bar code data segments being formed by an incidence of said scanning lines upon said bar code;

means for determining a data head and a data tail for each of said bar code data segments; and means for combining said plurality of bar code data segment sin accordance with the respective data heads and data tails, thereby forming a continuous data stream of said bar code, said combining means comprising:

calculating means for determining an address difference between said data tail from each said scanning line and a data head from a next adjacent scanning line, comparison means for comparing a similarity between said bar code data segment from said scanning line and an overlapping bar code data located, in accordance with said address difference, before said data head on said next adjacent scanning line, means for connecting said data head of said next adjacent scanning line to said data tail of said scanning line if said similarity falls within a predetermined range, and means for repeating said connecting step until said data tail is said second fixed edge.

3. A bar code scanning and data-combining system comprising:

a scanner, capable of being moved relative to a bar code having a first and second edge, comprising:

means for emitting a plurality of one-dimensional images, said plurality of one-dimensional images thereby forming a plurality of parallel scanning lines as said scanner is moved once across said bar code in a single direction, said emitting means including address generating means for sequentially generating an address for each of said plurality of one-dimensional images at a corresponding point in time, so that each of said plurality of scanning lines has a corresponding sequence of addresses, and means for reading a plurality of bar code data segments from adjacent parallel scanning lines, said bar code data segments being formed by an incidence of said scanning lines upon said bar code, said reading means comprising pre-processing means for determining whether a first occurrence of a fixed edge at said first edge of said bar code has occurred and whether a second occurrence of a fixed edge at said second edge of said bar code has occurred, logic means for determining whether a third occurrence of a fixed edge at said first and second edge along one of said plurality of scanning lines has occurred, and receiving means for sequentially reading said plurality of bar code data segments until said first and second occurrences have both occurred, or unless said third occurrence has occurred;

means for determining a data head and a data tail for each of said bar code data segments; and means for combining said plurality of bar code data segments in accordance with the respective data heads and data tails, thereby forming a continuous data stream of said bar code, said combining means comprising:

calculating means for determining an address difference between said data tail from each said scanning line and a data head from a next adjacent scanning line, comparison means for comparing a similarity between said bar code data segment from said scanning line and an overlapping bar code data located, in accordance with said address difference, before said data head on said next adjacent scanning line, means for connecting said data head of said next adjacent scanning line to said data tail of said scanning line if said similarity falls within predetermined range, and means for repeating said connecting step until said data tail is said second fixed edge.

* * * * *